United States Patent
Kashida et al.

(10) Patent No.: US 7,459,239 B2
(45) Date of Patent: Dec. 2, 2008

(54) NON-AQUEOUS ELECTROLYTIC SOLUTION AND BATTERY

(75) Inventors: Meguru Kashida, Usui-gun (JP); Satoru Miyawaki, Usui-gun (JP); Tetsuo Nakanishi, Usui-gun (JP); Mikio Aramata, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 237 days.

(21) Appl. No.: 11/202,167

(22) Filed: Aug. 12, 2005

(65) Prior Publication Data

US 2006/0046150 A1 Mar. 2, 2006

(30) Foreign Application Priority Data

Aug. 24, 2004 (JP) ............................ 2004-243940
Oct. 15, 2004 (JP) ............................ 2004-301193

(51) Int. Cl.
*H01M 6/14* (2006.01)
(52) U.S. Cl. ...................................... 429/302; 429/322
(58) Field of Classification Search ........................ None
See application file for complete search history.

(56) References Cited

U.S. PATENT DOCUMENTS

| | | | | |
|---|---|---|---|---|
| 5,885,733 A | * | 3/1999 | Ohsawa et al. .............. | 429/309 |
| 6,124,062 A | | 9/2000 | Horie et al. | |
| 7,211,353 B2 | * | 5/2007 | Kashida et al. ............. | 429/313 |
| 2004/0197668 A1 | | 10/2004 | Jung et al. | |
| 2006/0008706 A1 | * | 1/2006 | Yamaguchi et al. ......... | 429/313 |

FOREIGN PATENT DOCUMENTS

| | | |
|---|---|---|
| EP | 0 932 215 | 7/1999 |
| JP | 11-214032 | 8/1999 |
| JP | 2000-58123 | 2/2000 |
| JP | 2001-110455 | 4/2001 |
| JP | 2003-142157 | 5/2003 |
| JP | 2004-235141 A * | 8/2004 |

OTHER PUBLICATIONS

Abstract for KR 2003059729.*
Abstract for JP 2004-235141.*

* cited by examiner

*Primary Examiner*—Marc S Zimmer
(74) *Attorney, Agent, or Firm*—Oblon, Spivak, McClelland, Maier & Neustadt, P.C.

(57) ABSTRACT

A non-aqueous electrolytic solution is provided comprising a non-aqueous solvent, an electrolyte salt, and a siloxane modified with ether bond-bearing organic group. A non-aqueous electrolyte secondary battery using the same has improved characteristics both at low temperatures and at high outputs.

5 Claims, No Drawings

NON-AQUEOUS ELECTROLYTIC SOLUTION AND BATTERY

CROSS-REFERENCE TO RELATED APPLICATION

This non-provisional application claims priority under 35 U.S.C. §119(a) on Patent Application Nos. 2004-243940 and 2004-301193 filed in Japan on Aug. 24, 2004 and Oct. 15, 2004, respectively, the entire contents of which are hereby incorporated by reference.

TECHNICAL FIELD

This invention relates to a non-aqueous electrolytic solution comprising a siloxane modified with an ether bond-bearing organic group, for use in a lithium ion secondary battery capable of charge/discharge operation by migration of lithium ions between positive and negative electrodes, and a battery using the same. The battery using the electrolytic solution of the invention has improved temperature characteristics and high-outputs characteristics.

BACKGROUND ART

Because of their high energy density, lithium ion secondary batteries are increasingly used in recent years as portable power sources for laptop computers, mobile phones, digital cameras and the like. Also great efforts are devoted to the development of lithium ion secondary batteries as power sources for electric automobiles which are desired to reach a practically acceptable level as environment-friendly automobiles.

The lithium ion secondary batteries, albeit their high performance, are not satisfactory with respect to discharge characteristics in a rigorous environment, especially low-temperature environment, and discharge characteristics at high output levels requiring a large quantity of electricity within a short duration of time.

Reference should be made to JP-A 11-214032, JP-A 2000-58123 both corresponding to U.S. Pat. No. 6,124,062, JP-A 2001-110455, and JP-A 2003-142157.

SUMMARY OF THE INVENTION

An object of the present invention is to provide a non-aqueous electrolytic solution which enables construction of a battery, especially a non-aqueous electrolyte secondary battery, having improved discharge characteristics both at low temperatures and at high outputs, and a battery using the same.

The inventors have discovered that when a non-aqueous electrolytic solution comprising a siloxane modified with an ether bond-bearing organic group as represented by formula (1) below is used in a secondary battery, the battery is improved in discharge characteristics both at low temperatures and at high outputs.

Specifically, the present invention provides a non-aqueous electrolytic solution comprising a non-aqueous solvent, an electrolyte salt, and a siloxane. The siloxane is a straight chain organo(poly)siloxane of the formula (1) shown below, containing in the molecule one to five monovalent hydrocarbon groups each of which is bonded to a silicon atom at the end of the molecular chain and/or a silicon atom midway of the molecular chain (non-terminal position of the molecular chain), which has one to three ether-bond oxygen atoms, and which may optionally have an ester bond.

The present invention also provides a battery comprising a positive electrode, a negative electrode, a separator, and an electrolytic solution which is the non-aqueous electrolytic solution defined above.

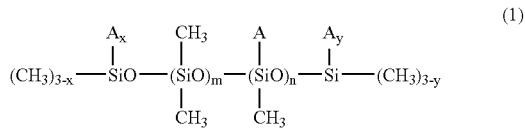

Herein A is a group having the following formula (2) or (3):

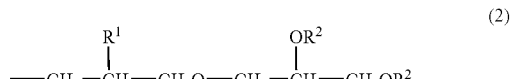

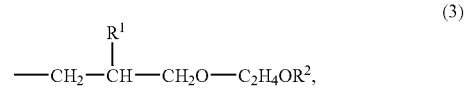

x and y each are 0 or 1, m and n each are an integer of 0 to 3, with the proviso that n is not equal to 0 when x+y=0, $R^1$ is hydrogen or methyl, and $R^2$ is methyl, ethyl, propyl or acetyl.

The battery using a non-aqueous electrolytic solution comprising a siloxane modified with an ether bond-bearing organic group as represented by formula (1) has improved temperature characteristics and high-output characteristics.

DESCRIPTION OF THE PREFERRED EMBODIMENTS

The siloxane used in the non-aqueous electrolytic solution of the invention is a siloxane modified with an ether bond-bearing organic group, represented by the following formula (1).

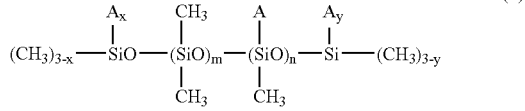

Herein A is a group having the following formula (2) or (3).

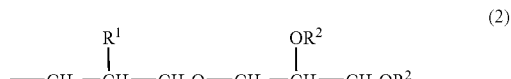

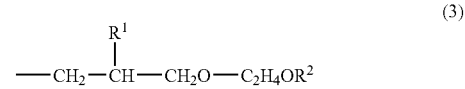

The subscripts x and y each are 0 or 1, and preferably $1 \leq x+y$, that is, x+y is equal to 1 or 2. The subscripts m and n each are an integer of 0 to 3, that is, m+n is an integer of 0 to 6, preferably an integer of 0 to 3, and more preferably an integer of 0 to 2, with the proviso that n is not equal to 0 when x+y=0. Namely, the siloxane of formula (1) has at least one group of formula (2) or (3). $R^1$ is a hydrogen atom or methyl group, and $R^2$ is a methyl, ethyl, propyl or acetyl group.

The siloxane modified with an ether bond-bearing organic group, represented by formula (1), ensures more smooth migration of lithium ions along the electrode surface and between electrodes via a separator, probably because it is more compatible with an electrolyte salt due to the inclusion of an ether bond and possesses a siloxane bond having better wettability.

Examples of the siloxane modified with an ether bond-bearing organic group, as represented by formula (1), are given below.

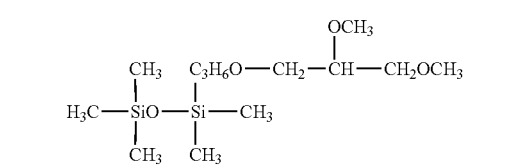
(4)

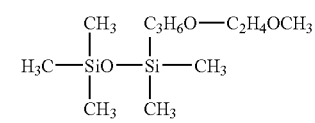
(5)

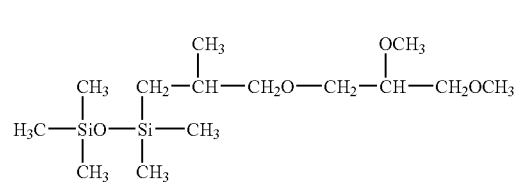
(6)

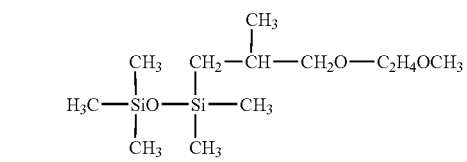
(7)

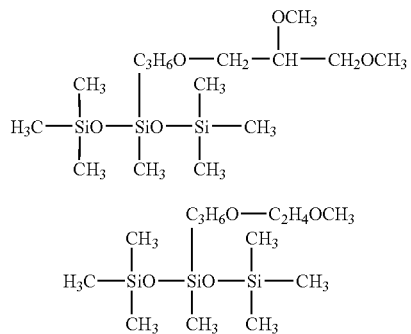
(8)

(9)

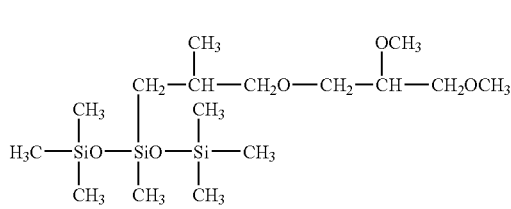
(10)

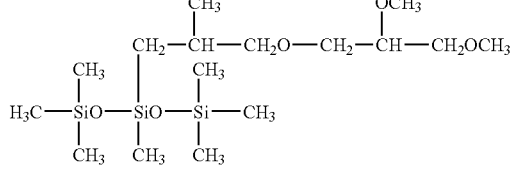

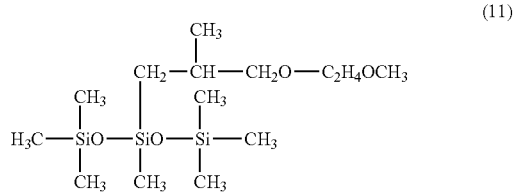
(11)

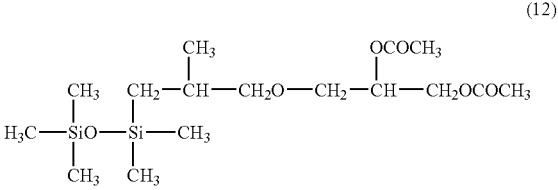
(12)

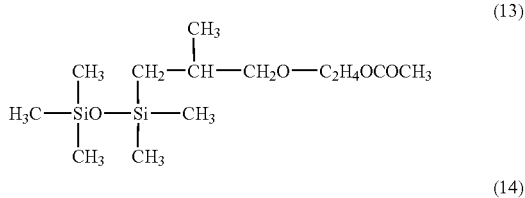
(13)

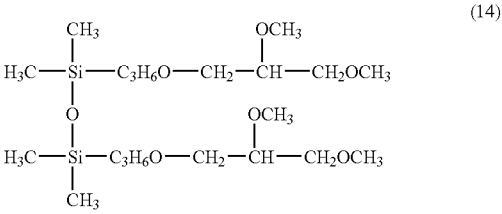
(14)

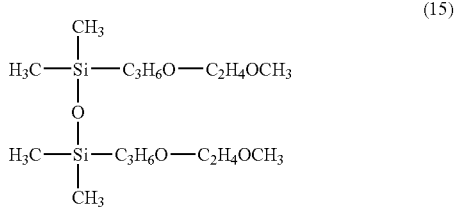
(15)

The siloxane modified with an ether bond-bearing organic group, represented by formula (1), can be prepared by addition reaction between a siloxane having a silicon atom-bonded hydrogen atom (SiH group) and a compound having an ether bond and an allyl or methallyl group necessary for addition reaction. For preparation of the siloxane modified with an ether bond-bearing organic group, represented by formula (4), for example, a compound of formula (16):

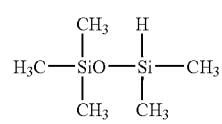
(16)

is used as the siloxane having an SiH group, and a compound of formula (17):

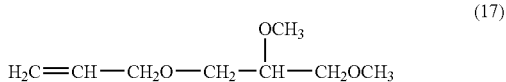

(17)

is used as the compound having an ether bond and an allyl or methallyl group necessary for addition reaction.

The addition reaction is desirably effected in the presence of a platinum or rhodium catalyst. Suitable catalysts used herein include chloroplatinic acid, alcohol-modified chloroplatinic acid, and chloroplatinic acid-vinyl siloxane complexes. Sodium acetate or sodium citrate may be added as a co-catalyst. The amount of the catalyst used is a catalytic amount, preferably up to 50 ppm, and more preferably up to 20 ppm of platinum or rhodium based on the total weight of the SiH group-containing siloxane and the allyl or methallyl group-containing compound.

If desired, the addition reaction may be effected in an organic solvent. Suitable organic solvents include aliphatic alcohols such as methanol, ethanol, 2-propanol and butanol; aromatic hydrocarbons such as toluene and xylene; aliphatic or alicyclic hydrocarbons such as n-pentane, n-hexane, and cyclohexane; and halogenated hydrocarbons such as dichloromethane, chloroform and carbon tetrachloride.

Addition reaction conditions are not particularly limited. Typically addition reaction is effected under reflux for about 1 to 10 hours.

In the non-aqueous electrolytic solution, the siloxane modified with an ether bond-bearing organic group, represented by formula (1), should preferably be present in an amount of at least 0.001% by volume. With less than 0.001% by volume of the siloxane, the desired effect may not be exerted. The preferred content is at least 0.1% by volume. The upper limit of the siloxane content varies with a particular type of solvent used in the non-aqueous electrolytic solution, but should be determined such that migration of Li ions within the non-aqueous electrolytic solution is at or above the practically acceptable level. The siloxane content is usually up to 80% by volume, preferably up to 50% by volume, and more preferably up to 30% by volume of the non-aqueous electrolytic solution.

No particular limit is imposed on the viscosity of the siloxane modified with an ether bond-bearing organic group, represented by formula (1). For smooth migration of Li ions within the non-aqueous electrolytic solution, the siloxane should preferably have a viscosity of up to 100 mm$^2$/s, more preferably up to 50 mm$^2$/s, as measured at 25° C. by a Cannon-Fenske viscometer. The lower limit of viscosity is usually at least 0.1 mm$^2$/s, though not critical.

The non-aqueous electrolytic solution of the invention further contains an electrolyte salt and a non-aqueous solvent.

The electrolyte salt used herein is not particularly limited as long as it can serve as an electrolyte. Most often, lithium metal salts are used, for example, $LiPF_6$, $LiBF_4$, $LiClO_4$, $LiSbF_6$, $LiCF_3SO_3$, $LiN(CF_3SO_2)_2$, and $LiC(CF_3SO_2)_3$. These salts may be used in admixture. From the electric conductivity aspect, the electrolyte salt is preferably present in a concentration of 0.5 to 2.0 mole/liter of the non-aqueous electrolytic solution.

The non-aqueous solvent used herein is not particularly limited as long as it can serve for the non-aqueous electrolytic solution. Suitable solvents include aprotic high-dielectric-constant solvents such as ethylene carbonate, propylene carbonate, butylene carbonate, and γ-butyrolactone; and aprotic low-viscosity solvents such as dimethyl carbonate, ethyl methyl carbonate, diethyl carbonate, methyl propionate, methyl acetate, tetrahydrofuran, and dimethoxyethane. It is desirable to use a mixture of an aprotic high-dielectric-constant solvent and an aprotic low-viscosity solvent in a proper ratio.

If desired, various additives may be added to the non-aqueous electrolytic solution of the invention. Examples include an additive for improving cycle life such as vinylene carbonate, methyl vinylene carbonate, ethyl vinylene carbonate and 4-vinylethylene carbonate, an additive for preventing over-charging such as biphenyl, alkylbiphenyl, cyclohexylbenzene, t-butylbenzene, diphenyl ether, and benzofuran, and various carbonate compounds, carboxylic acid compounds, nitrogen- and sulfur-containing compounds for acid removal and water removal purposes.

Another embodiment of the present invention is a battery, especially a non-aqueous electrolytic solution secondary battery, comprising a positive electrode, a negative electrode, a separator, and an electrolytic solution, wherein the non-aqueous electrolytic solution described above is used as the electrolytic solution.

The components other than the electrolytic solution may be the same as in well-known secondary batteries. The material of which the positive electrode is made is preferably a complex oxide of lithium and a transition metal such as cobalt, manganese or nickel. Examples include $LiCoO_2$, $LiMnO_2$ and $LiNiO_2$. Part of the transition metal may be replaced by another metal such as Fe, Si, Zn, Cu, Mg, Ga, Ti, Al, Cr, and V. These positive electrode materials may be used in admixture.

The material of which the negative electrode is made is not particularly limited as long as it is capable of occluding and releasing lithium. Generally used are carbonaceous materials such as graphite, metals such as silicon and tin, oxides of such metals, lithium metal, and lithium alloys. These negative electrode materials may be used in admixture.

Any desired method may be used in the preparation of positive and negative electrodes. Electrodes are generally prepared by adding an active material, binder, conductive agent and the like to a solvent to form a slurry, applying the slurry to a current collector sheet, drying and press bonding. The binder used herein is usually selected from polyvinylidene fluoride, polytetrafluoroethylene, styrene-butadiene rubber, isoprene rubber, and various polyimide resins. The conductive agent used herein is usually selected from carbonaceous materials such as graphite and carbon black, and metal materials such as copper and nickel. As the current collector, aluminum and aluminum alloys are usually employed for the positive electrode, and metals such as copper, stainless steel and nickel and alloys thereof employed for the negative electrode.

The separator disposed between the positive and negative electrodes is not particularly limited as long as it is stable to the electrolytic solution and holds the solution effectively. The separator is most often a porous sheet or non-woven fabric of polyolefins such as polyethylene and polypropylene.

The battery may take any desired shape. In general, the battery is of the coin type wherein electrodes and a separator, all punched into coin shape, are stacked, or of the cylinder type wherein electrode sheets and a separator are spirally wound.

EXAMPLE

Examples of the present invention are given below for further illustrating the invention, but they are not construed as limiting the invention thereto. The viscosity (mm²/s) is measured at 25° C. by a Cannon-Fenske viscometer.

Example 1

Synthesis of Siloxane Modified with Ether Bond-bearing Organic Group

The siloxane having formula (4) was synthesized as follows.

A reactor equipped with a stirrer, thermometer and reflux condenser was charged with 100 g of 1,2-dimethoxyglycerin monoallyl ether, 100 g of isopropyl alcohol (IPA), and 0.05 g of an IPA solution of 0.5 wt % chloroplatinic acid. With stirring at 60° C., 107 g of pentamethyldisiloxane having formula (16) was added dropwise to the mixture. Reaction took place while the molar ratio of terminal unsaturated groups to SiH groups was about 1.05. The reaction solution was precision distilled in vacuum, obtaining the siloxane modified with ether bond-bearing organic group, represented by formula (4). It had a viscosity of 5.5 mm2/s and a purity of 99.9% as analyzed by gas chromatography.

Preparation of Non-aqueous Electrolytic Solution

A non-aqueous electrolytic solution was prepared by dissolving 5% by volume of the siloxane having formula (4) in 47.5% by volume of ethylene carbonate and 47.5% by volume of diethyl carbonate and further dissolving LiPF$_6$ therein in a concentration of 1 mol/liter.

Preparation of Battery Materials

The positive electrode material used was a single layer sheet using LiCoO$_2$ as the active material and an aluminum foil as the current collector (trade name Pioxcel C-100 by Pionics Co., Ltd.). The negative electrode material used was a single layer sheet using graphite as the active material and a copper foil as the current collector (trade name Pioxcel A-100 by Pionics Co., Ltd.). The separator used was a porous membrane of polyolefin (trade name Celgard 2400 by Celgard Co., Ltd.).

Battery Assembly

A battery of 2032 coil type was assembled in a dry box blanketed with argon, using the foregoing battery materials, a stainless steel can housing also serving as a positive electrode conductor, a stainless steel sealing plate also serving as a negative electrode conductor, and an insulating gasket.

Battery Test (Low-temperature Characteristics)

The steps of charging (up to 4.2 volts with a constant current flow of 0.6 mA) and discharging (down to 2.5 volts with a constant current flow of 0.6 mA) at 25° C. were repeated 10 cycles, after which similar charging/discharging steps were repeated at 5° C. Provided that the discharge capacity at the 10th cycle at 25° C. is 100, the number of cycles repeated until the discharge capacity at 5° C. lowered to 80 was counted.

For comparison purposes, a battery of 2032 coil type was assembled using a siloxane-free non-aqueous electrolytic solution, and similarly tested.

As a result, the battery with the siloxane-containing non-aqueous electrolytic solution marked 135 cycles whereas the battery with the siloxane-free non-aqueous electrolytic solution marked 85 cycles.

Battery Test (High-output Characteristics)

The steps of charging (up to 4.2 volts with a constant current flow of 0.6 mA) and discharging (down to 2.5 volts with a constant current flow of 0.6 mA) at 25° C. were repeated 5 cycles, after which similar charging/discharging steps in which the charging conditions were kept unchanged, but the discharging current flow was increased to 5 mA were repeated 5 cycles. These two types of charging/discharging operation were alternately repeated. Provided that the discharge capacity at the 5th cycle in the initial 0.6 mA charge/discharge operation is 100, the number of cycles repeated until the discharge capacity lowered to 80 was counted.

For comparison purposes, a battery of 2032 coil type was assembled using a siloxane-free non-aqueous electrolytic solution, and similarly tested.

As a result, the battery with the siloxane-containing non-aqueous electrolytic solution marked 153 cycles whereas the battery with the siloxane-free non-aqueous electrolytic solution marked 93 cycles.

Examples 2 to 6

For other siloxanes modified with ether bond-bearing organic group as listed in Table 1, their battery performance was examined as in Example 1. The results are shown in Table 1 together with those of Example 1 and Comparative Example.

TABLE 1

| | Siloxane | | Battery performance | |
|---|---|---|---|---|
| | Chemical structure | Viscosity (mm²/s) | Low-temperature test (cycles) | High-output test (cycles) |
| Example 1 | formula (4) | 5.5 | 135 | 153 |
| Example 2 | formula (5) | 3.8 | 126 | 147 |
| Example 3 | formula (6) | 6.5 | 131 | 152 |
| Example 4 | formula (7) | 4.5 | 125 | 143 |
| Example 5 | formula (8) | 10.2 | 133 | 146 |
| Example 6 | formula (9) | 9.2 | 127 | 141 |
| Comparison | — | — | 85 | 93 |

Japanese Patent Application Nos. 2004-243940 and 2004-301193 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A non-aqueous electrolytic solution comprising a non-aqueous solvent, an electrolyte salt, and a siloxane having the following general formula (1):

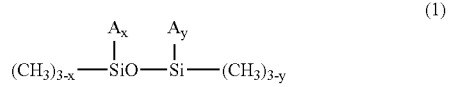

wherein A is a group having the following general formula (2) or (3):

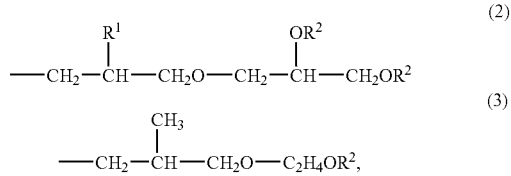

x and y are each independently equal to 0 or 1, x+y is equal to 1 or 2, $R^1$ is selected from the group consisting of hydrogen and methyl, and $R^2$ is selected from the group consisting of methyl, ethyl, propyl and acetyl.

2. The non-aqueous electrolytic solution according to claim 1, wherein the siloxane is present in an amount of at least 0.001% by volume.

3. The non-aqueous electrolytic solution according to claim 1, wherein the electrolyte salt is a lithium metal salt.

4. A battery comprising a positive electrode, a negative electrode, a separator, and the non-aqueous electrolytic solution according to claim 1.

5. The non-aqueous electrolytic solution according to claim 1, wherein the siloxane is a siloxane selected from the group consisting of the following formula (4), (6), (7), (12), (13) and (14):

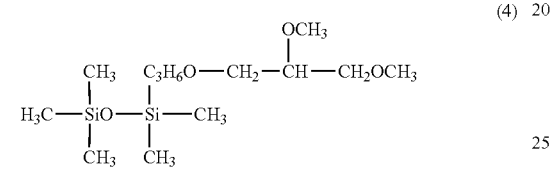
(4)

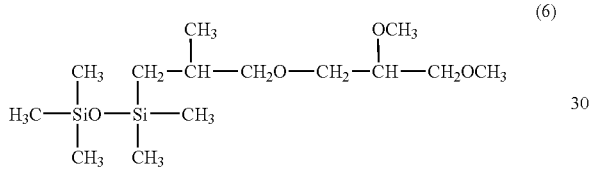
(6)

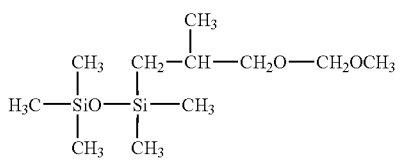
(7)

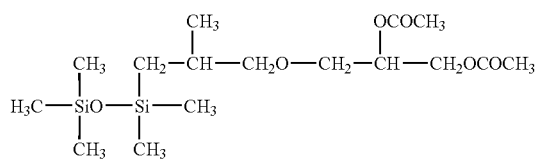
(12)

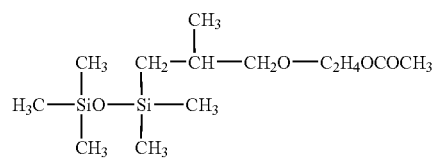
(13)

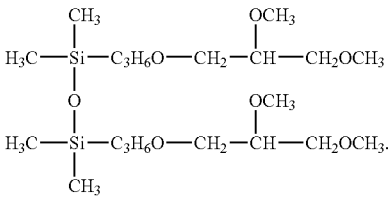
(14)

* * * * *

UNITED STATES PATENT AND TRADEMARK OFFICE
CERTIFICATE OF CORRECTION

| | | |
|---|---|---|
| PATENT NO. | : 7,459,239 B2 | Page 1 of 1 |
| APPLICATION NO. | : 11/202167 | |
| DATED | : December 2, 2008 | |
| INVENTOR(S) | : Kashida et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this
Second Day of October, 2012

David J. Kappos
*Director of the United States Patent and Trademark Office*